Sept. 29, 1942. E. A. PAUL 2,297,111
APPARATUS FOR OPERATING FLASH LIGHTS AND CAMERAS
Filed Oct. 11, 1939
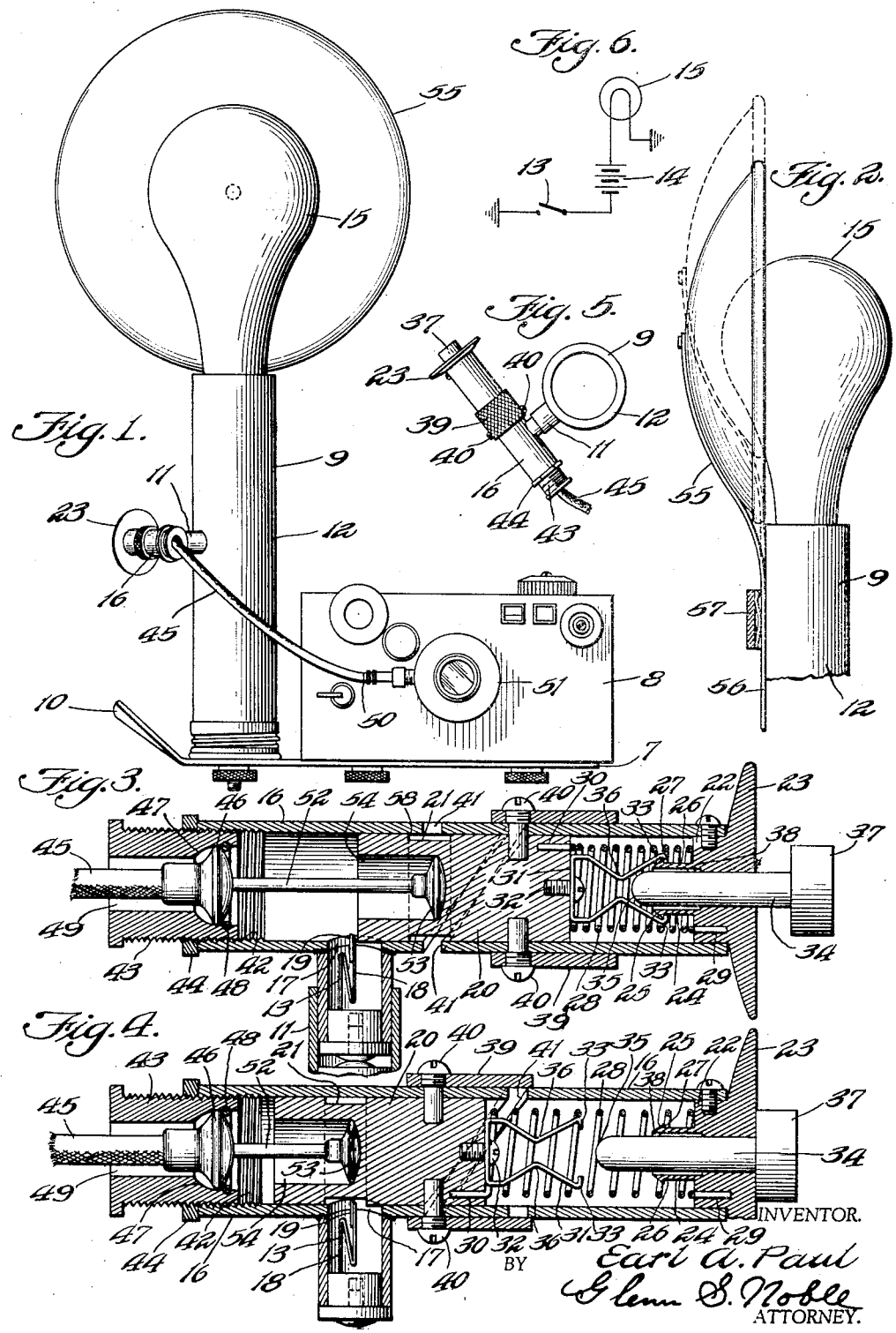
INVENTOR.
Earl A. Paul
BY Glenn S. Noble
ATTORNEY.

Patented Sept. 29, 1942

2,297,111

UNITED STATES PATENT OFFICE 2,297,111

APPARATUS FOR OPERATING FLASHLIGHTS AND CAMERAS

Earl A. Paul, Griffith, Ind., assignor to James H. Smith & Sons Corporation, Griffith, Ind., a corporation of Indiana Application October 11, 1939, Serial No. 298,912

4 Claims. (Cl. 67—29)

In modern cameras, the time from when the leaves of the shutters start to open until it closes varies greatly, as from one-tenth of a second to one five-hundredth of a second. Most of such cameras are operated by wire or cable releases, some having shutters of the automatic type and others of the preset type. Photo-flash lamps commonly used for furnishing the desired illumination are either of foil or fine wire filled types. I have found that the time from closing the electric contact to the peak of flash is about twenty-three milli-seconds and the duration of the peak of the flash is from one fiftieth to one sixty-sixth of a second, the total duration of flash being from one-twentieth to one-thirtieth of a second. On account of this delay or lag between the closure of the electric contact for firing the electrical flash bulbs and the reaching of the peak point of illumination I have found that it is necessary or desirable to provide a corresponding slight delay in the operation of the shutter in relation to the making of the electrical contact so that the flash bulb may be up to its point of peak illumination before the maximum point of shutter opening is reached. Synchronizers have heretofore been proposed for such operations but instead of the time of closing the contact to the time of operating the shutter being synchronous I have found that they should be asynchronous.

The present invention relates to means for properly timing the flashing of the lamp and the operating of the shutter in order to produce the best results.

The objects of the invention are to provide an improved apparatus for actuating the light switch of a photo-flash lamp and tripping the shutter of a camera in predetermined sequence; to provide means for supporting a camera and photo-flash lamp, together with means for actuating the same; to provide such actuating means as will not tend to jar or disturb the camera during exposure when the devices are operated; to provide novel adjusting means for the shutter release; and to provide such other improvements and advantages as will appear more fully hereinafter.

In the accompanying drawing illustrating this invention:

Fig. 1 is a front view of the apparatus;

Fig. 2 is a side view of the lamp with parts broken away or shown in section for convenience in illustration;

Fig. 3 is an enlarged longitudinal sectional view of the operating mechanism shown in cocked position or position ready for operation;

Fig. 4 is a similar view showing the parts after operation;

Fig. 5 is a fragmentary plan view; and

Fig. 6 shows the wiring diagram.

In the particular form of the invention as shown in the drawing, a plate or base 7 is provided for supporting the camera 8 and the photo-flash lamp 9 which may be attached thereto in any desired manner. One end of the plate is turned upwardly to provide a palm rest 10 for convenience in supporting the apparatus, it being understood that the operator will usualy hold the camera in front of him in order to focus it when taking the picture. The photo-flash lamp and camera may of course be of any well known or preferred devices commonly used in this art.

A short tube 11 is secured to the cylinder or casing 12 of the flash lamp and is preferably positioned a short distance above the finger-piece 10. This tube contains the switch 13 for closing the circuit from any suitable source of electricity 14 to the flash bulb 15. A transverse shell or cylinder 16 is secured to the tube 11 and has an opening 17 through which one terminal 18 of the switch extends for a short distance into the tube. This terminal is in the form of a wipe-contact spring and one side of the spring is provided with insulation 19 at its outer or free end. A plunger 20 is slidably mounted in the cylinder 16 and has an annular recess 21 into which the end of the contact 18 extends when the plunger is in normal position. One end of the cylinder 16 is closed by a plug or cap 22 having an enlarged outer end 23 and an inwardly extending projection 24 which is tapered at 25 and has an annular groove 26 with a shoulder 27 adjacent to its inner end. A compression spring 28 engages with the cap 22 and with the plunger 20, the ends of the spring being extended longitudinally and engaging with holes 29 and 30 in the respective parts whereby the spring may be given a twisting or torsional strain as well as being compressed longitudinally. The plunger 20 is held in retracted position by means of a spring 31 which is secured to the plunger by means of a screw 32. The spring is of hourglass shape and its outer or free ends 33 slide over the beveled end of the projection and engage with shoulder 27, thus holding the plunger against the tension of the spring 28. This holding spring may be released by a small rod or plunger 34 which extends through the cap 22 and is rounded at its inner end 35 for engagement with the converging portions 36 of the spring 31. This causes the ends 33 to be released from the shoulder so that the plunger is free to move forwardly. The rod 34 has a button 37 at its outer end for actuating the same and is held against accidental disengagement by means of a small lug or projection 38 adjacent to its inner end.

The plunger 20 is actuated by a ring 39 which is slidably mounted on the cylinder 16 and is provided with studs or pins 40 which have threaded engagement with the ring 39 and extend inwardly through helical or diagonal slots 41 in the cylinder and engage with the plunger 20 as shown in Figure 3.

One end of the cylinder 16 is threaded with fine threads 42 which are engaged by a correspondingly threaded plug 43 having a lock nut 44 for holding it in adjusted position. One end of the wire release tube 45 is provided with a head 46 which engages with a recess 47 in the inner end of the plug and is held in rotatable engagement therein by a lock ring 48. The wire release extends out through a hole 49 in the plug and its opposite end 50 is screwed into the shutter 51 of the camera in the usual manner. The release has the usual flexible wire or cable 52 which projects through the head 46 and has an operating button 53 that engages with a socket 54 in the end of the plunger 20.

The lamp 15 is provided with a reflector 55 having a stem 56 which adjustably engages a keeper 57 on the battery casing 12, as shown in Figure 2. This provides means for readily adjusting the reflector for different sized lamps.

When the device is to be assembled for use, the operator backs out the plug 43 to a considerable extent and also backs off the lock nut 44. The wire release is then screwed into the shutter and the threaded plug is then slowly screwed into the tube until it reaches a point where it just trips the shutter. It is then locked in this position by the lock ring and this will insure operation of the shutter at its various speeds at just the proper moment to insure proper timing of the peak light of the photo-flash bulb. The setting of the wire release in this manner positions the plunger or end of the release cable 53 at a point where the shutter trips and the operation of the device cannot drive the wire release plunger past this point and therefore any danger of injury to the shutter by driving the wire release plunger farther is eliminated.

After this connection has been made and a picture is to be taken the outer sliding knurled ring 39 is drawn back until the hourglass spring 31 engages the shoulder 27 and serves as a detent to hold the plunger in cocked position. It will be noted that as the ring is drawn back it is given a slight rotary movement due to the engagement of the screws 40 with the slots 41 and this also gives a torsion to the spring 28. This movement of the plunger also moves the pin 34 outwardly or it may be withdrawn previous to such setting. During this backward movement of the plunger the shoulder 58 at the end of the recess 21 engages with the insulation 19 on the end of the spring contact 18 and pulls it backward until the end of the plunger passes beyond the spring, at which time the contact moves to the position shown at Figure 3.

The firing or actuation of the device is accomplished by pushing in on the button 37 which causes the rod 34 to spread the ends of the spring 31 out of engagement with the shoulder 27 and thereupon the spring 28 forces the plunger inwardly with a rotative movement due to the travel of the screws 40 in the helical or beveled slots 41 such travel also serving to control the time of the movement of the plunger in its operating stroke. Immediately at the start of this movement the end of the plunger makes contact with the end of the spring contact 18 and closes the circuit from the source of electricity 14 to the lamp or lamps. Thereafter the shutter release is actuated and the slight delay between the closing of the circuit and the operation of the shutter provides the desired lag to permit the flash bulb to reach its peak of illumination before the shutter is fully open. This delay is secured in part by the spiral or rotative travel of the plunger which retards its forward movement just the slight amount required. Without this retarding action the shutter would be operated too early in relation to the firing of the bulb for best results. It will be understood that the circuit to the lamp may be provided in any well known manner as by means of wires or through grounding of some of the parts. After the device has been actuated it may again be cocked or set ready for the next firing as above described.

From this description it will be seen that I provide a moderate priced apparatus which will give perfect timing for photo-flash lamps with both pre-set and automatic types of wire release shutters, and the device may be readily set by the operator to insure the proper relative operation of the shutter in relation to the moment of peak illumination of the flash bulb. The operating spring 28 furnishes sufficient power to actuate automatic types of shutters which require more power for operation than do the pre-set types of shutters. Another particularly desirable feature is that, after the device has been set, all that is necessary for the operator to do is to push in the operating button to release the mechanism. This eliminates any possibility of the unit being in any way affected by the speed or power of the push which any individual operator may use in operating the button. In other words, after the button has been pressed the further action is entirely automatic. The entire apparatus may be conveniently held in front of the operator in position for focusing and the operating mechanism actuated without any likelihood of jar or disturbance of the camera.

While I have shown and described a preferred form of the mechanism, changes may be made in order to adapt the same for different cameras or different flash lamps, without departing from the scope of the invention and therefore I do not wish to be limited to the particular construction except as specified in the following claims, in which I claim:

1. The combination with a camera having a shutter release or shutter operating trigger, of a flexible push cable for actuating the same, having the usual tube and having an operating head or button, a cylinder, means for adjustably securing the end of the cable tube in the end of the cylinder, a plunger slidably and rotatably mounted in the cylinder and adapted to strike said head to actuate the same, pins projecting outwardly from the plunger through helical slots in the cylinder which cause the plunger to rotate during its longitudinal movement and control the time thereof during the actuating movement of the plunger, a spring for actuating said plunger, means for retracting the plunger, means for holding the plunger in retracted position, means for releasing said holding means to permit movement of the plunger, and electric contacts actuated by said plunger to close an electric circuit at a predetermined time before the operation of the shutter for flashing a lamp.

2. A combined shutter operating and flash lamp operating device including a cylinder, means for securing the operating end of a shutter wire release in one end of the cylinder to permit longitudinal adjustment thereof, a plunger in said cylinder, a ring around the cylinder, pins secured to said ring and extending through helical slots in the cylinder and engaging with the plunger to direct the movement of the plunger and to stop the same, a head in the opposite end of the cylinder, a spring having its ends secured respectively to the plunger and the head for actuating the plunger and giving it a rotative movement, a projection on the head extending into the cylinder, a detent on the plunger engageable with said projection to hold the plunger in retracted position, and a thumb-piece mounted in the head and engageable with the detent to release the same, and contacts for closing an electric circuit to a photo-flash lamp, actuated by the plunger, the arrangement being such that the time between the closing of the contact and the operation of the shutter may be adjusted.

3. In an apparatus of the character set forth, a photo-flash lamp having a casing, a tube secured to said casing, an electric switch in the tube for closing the circuit from the batteries to the lamp, a cylinder secured to the tube, a plunger slidably mounted in the tube and having a peripheral groove for receiving the switch contact when in inoperative position, a head in said cylinder having an inwardly extending shouldered projection, an hourglass spring secured to the plunger with its ends engageable with the projection, a compression spring between the head and the plunger for moving the plunger, a ring around the cylinder, pins secured to the ring and extending through helical slots in the cylinder with their inner ends engaging with the plunger, a pin through the head having a thumb-piece and serving to release the hourglass spring from the shoulder, and means at the opposite end of the cylinder for supporting one end of a shutter wire release whereby it will be actuated by the movement of the plunger, said plunger also engaging with the switch contact when released to close the circuit to the lamp.

4. A combined camera shutter operating and photo-flash lamp operating apparatus including a cylinder, a shutter release coacting with the shutter, means for operatively connecting the release with the cylinder, a plunger in the cylinder for actuating the release, pins secured to the plunger and extending out through helical slots in the cylinder for controlling the movement of the plunger and to stop the same, a head in the end of the cylinder, a spring having its ends secured respectively to the plunger and the head for actuating the plunger and tending to give it rotative movement, a projection on the head extending into the cylinder, a detent on the plunger engageable with said projection to hold the plunger in retracted position, a thumb piece mounted in the head and engageable with the detent to release the same, and contacts for closing an electric circuit to the photo-flash lamp actuated by the plunger, the arrangement being such that the time between the closing of the contact and the operation of the cylinder is predetermined by the travel of the pins in said slots.

EARL A. PAUL.